United States Patent [19]

Sayles

[11] Patent Number: 5,281,286
[45] Date of Patent: Jan. 25, 1994

[54] MICROCOACERVATION OF PROPELLANT INGREDIENTS

[75] Inventor: David C. Sayles, Huntsville, Ala.

[73] Assignee: The United States of America as represented by the Secretary of the Army, Washington, D.C.

[21] Appl. No.: 865,540

[22] Filed: Apr. 9, 1992

[51] Int. Cl.$^5$ .............. C06B 45/00; C06B 21/00; A61J 5/00

[52] U.S. Cl. .................. 149/3; 149/19.2; 149/19.92; 149/2; 264/3.4; 264/3.5; 264/3.6; 264/4.1; 264/4.7

[58] Field of Search .......... 264/4.7, 4.1, 3.4, 3.5, 264/3.6; 149/19.2, 19.92, 19.93, 3, 2

[56] References Cited

U.S. PATENT DOCUMENTS

| | | | |
|---|---|---|---|
| H305 | 7/1987 | Mitchell et al. | 556/143 |
| H717 | 12/1989 | Stephens et al. | 149/19.2 |
| H778 | 5/1990 | Carlton | 149/19.2 |
| 3,480,488 | 11/1969 | Rudy et al. | 149/7 |
| 3,704,184 | 11/1972 | Kuehl et al. | 149/2 |
| 3,870,578 | 3/1975 | Nichols | 149/19.92 |
| 4,093,556 | 6/1978 | Wojciak | 264/4.7 |
| 4,166,045 | 8/1979 | Rudy et al. | 149/19.4 |
| 4,239,646 | 12/1980 | Vincent et al. | 264/4.7 |
| 4,304,185 | 12/1981 | Sayles | 149/19.2 |
| 4,318,760 | 3/1982 | Stephens et al. | 149/19.2 |
| 4,352,700 | 10/1982 | Hoffman | 149/19.2 |
| 4,460,563 | 7/1984 | Calanchi | 424/35 |
| 4,460,722 | 7/1984 | Igarashi et al. | 523/206 |
| 4,552,811 | 11/1984 | Brown et al. | 264/4.7 |
| 4,594,370 | 6/1986 | Adkins | 264/4.7 |
| 4,675,249 | 6/1987 | Bowman | 264/47 |
| 4,708,754 | 11/1987 | Sayles | 149/19.4 |
| 4,798,741 | 1/1989 | Nelson | 427/213.33 |
| 4,844,845 | 7/1989 | Clarke et al. | 264/3.1 |
| 4,867,817 | 9/1989 | Kneafsey et al. | 156/73.1 |
| 4,908,233 | 3/1990 | Takizawa et al. | 427/213.33 |
| 4,914,084 | 4/1990 | Ecanow | 514/6 |
| 4,963,192 | 10/1990 | Dessauer et al. | 106/499 |
| 5,049,212 | 9/1991 | Colick | 149/5 |
| 5,120,475 | 6/1992 | Chen et al. | 264/4.7 |

Primary Examiner—Edward A. Miller
Attorney, Agent, or Firm—Hugh P. Nicholson; Freddie M. Bush

[57] ABSTRACT

The coacervation of ferrocene and ferrocene derivative is carried out in a water-soluble polyol, coacervation mixture at a reaction temperature from about 40° C. to about 55° C. The coacervation mixture is comprised of about 70 to about 80 parts of a 1:1 ratio of water and a water soluble polyol selected from glycol, a glycerol, and an erythritol, a urea derivative selected from melamine and triazine, and an aldehyde or ketone selected from the water soluble aldehydes or ketones consisting of methanal, ethanal, propanal, propanone, and 2-butanone. Micro-droplets of the ferrocene derivative, 2,2-bis(ethylferrocenyl)propane, are formed by vigorous agitation of the coacervation mixture containing the ferrocene derivative. A polymeric coating on the outer surface of the micro-droplets produces a coacervate which is separated from the coacervation mixture. The coacervate polymeric coating of about 10 percent by weight enables the coated ferrocene derivative to be mixed in a solid propellant composition without rupturing and to achieve improved stability and compatibility as compared to liquid ferrocene and liquid ferrocene derivatives.

3 Claims, 2 Drawing Sheets

MICROCOACERVATION OF PROPELLANT INGREDIENTS

DEDICATORY CLAUSE

The invention described herein may be manufactured, used, and licensed by or for the Government for governmental purposes without the payment to me of any royalties thereon.

BACKGROUND OF THE INVENTION

Numerous processes for controlling the dispersing of finely divided particles in solid propellant have been developed. In addition to controlling potlife of a propellant composition during the mixing and formulating procedure, the coating of finely divided particles such as an oxidizer, particularly, ammonium perchlorate, prevents or minimizes the reaction between the coated or encapsulated oxidizer with the other ingredients of the propellant or with the agents used to cure the system.

U.S. Pat. No. 3,480,488 issued to T. P. Rudy et al is an example of prior art process of "Self-Regulating Coating Process For Propellant Materials." This process is a process for the encapsulating of oxidizer particles which are incompatible with the other ingredients in the solid propellant composition. Due to the polar nature of the oxidizing agents, a polar monomer, tris(2-methylaziridinyl)phosphine oxide (MAPO), and a nonpolar solvent n-hexadecane or purified alkane (boiling point 185°-200° C.) are required. Absolutely complete encapsulation is required in U.S. Pat. No. 3,480,488 because of the reactivity of the inorganic oxidizer with some of the other propellant ingredients.

More recently, U.S. Pat. No. 5,002,797, issued to applicant on Mar. 26, 1991, and assigned to the United States of America as represented by the Secretary of the Army, Washington, D.C., encompasses a process for aluminmum-encapsulated ammonium perchlorate by vapor deposition. This process yields a product which after being incorporated into a propellant composition achieves the following beneficial effects: (a) increasing the propellant's burning rate; (b) extending the storage life of interceptor motors; and (c) improving the propellant mechanical properties.

Solid propellant compositions employing ammonium perchlorate have also used ferrocene or the more expensive ferrocene derivative, liquid Catocene, the registered trademark for Syntex Chemicals, Inc. 2,2-bis(ethylferrocenyl)propane ($C_{27}H_{32}Fe_2$), as a high burning rate accelerator.

The problem of migration of Catocene has been a concern. To inhibit the migration of Catocene from a propellant composition of rocket motor, into the liner-barrier, a larger amount is incorporated into the liner-barrier. For example, if 5% Catocene is incorporated into the propellant formulation, an amount of 25-30% Catocene in the liner-barrier is required to achieve the equilibrium conditions necessary to ensure no degradation of the propellant burning rate due to excessive migration out of the propellant.

The incorporation of Catocene has been contraindicated because of the tendency of the propellant to become increasingly sensitive to initiation by various stimuli with aging, but, because of the need of the burning rate augmentation that Catocene, and only Catocene, can provide, has necessitated its use in spite of the fact that there have been a number of serious accidents which have occurred with Catocene-containing propellants.

No satisfactory means have been discovered previously which would prevent the migration of Catocene when it is incorporated into a solid propellant. Thus, the need is highly recognized for a process to convert Catocene to a form which not only results in the reduction of its diffusibility and migratability in solid propellants but also reduces its sensitivity.

Therefore, an object of this invention is to provide a method of converting potential propellant ingredients which cannot be used because of their high reactivity, hygroscopicity, incompatibility, etc. into usable propellant ingredients.

A further object of this invention is to provide a method which employs coacervation to convert the high-burning rate accelerator, Catocene, into a coacervated product.

SUMMARY OF THE INVENTION

A method of converting potential propellant ingredients, which cannot be used because of their high reactivity, hygroscopicity, and incompatibility, into usable propellant ingredients employs coacervation. This method is particularly useful for ferrocene and derivatives thereof. Coacervation is defined as being comprised of an aggregate of colloidal droplets which consist of two hydrophilic sols or a sol and oppositely-charged ions which are held together by electrostatic attraction forces. The representative method of converting the liquid propellant ingredient, Catocene, is set forth below.

The coacervation of Catocene is carried out in the following manner using a coacervation material which consists of a water-soluble polyol, a urea derivative, and a water soluble aldehyde or ketone. The coacervation reactant product is a mixed polymethanal having an empirical formula of $C_9H_{12}N_6O_3$. The coacervation reaction is conducted at 40°-55°C. At this reaction condition, the monomer (the polymethanal) undergoes polymerization at the surface of the Catocene droplets which are suspended in the aqueous medium. The polymerized coacervating mixture coats out on the outer surface of the Catocene droplets. Polymer-coating of the Catocene droplets takes place during several hours.

The urea derivative is selected from melamine, triazine, and other urea derivatives for forming a polymerized coacervating mixture which coats out on the surface of Catocene, (2,2-bis(ethylferrocenyl)propane). The polyol is selected from a glycol, glycerol, and erythritol. The aldehyde or ketone is selected from the group consisting of methanal, ethanal, propanal, propanone, and 2-butanone. The containment of Catocene during propellant mixing was ascertained by microscopic examination which showed that the coacervated material was intact, and had not undergone rupture.

DESCRIPTION OF THE PREFERRED EMBODIMENT(S)

The coacervation of ferrocene and ferrocene derivatives thereof converts potential propellant ingredients, which normally cannot be employed without major side effects due to their high reactivity, hygroscopicity, tendency to migrate, and incompatibility with other propellant ingredients, into usable ingredients.

The preferred ferrocene derivative, 2,2-bis(ethylferrocenyl)propane, is registered under trademark Catocene of Syntex Chemicals, Inc. The structural formula of Catocene is set forth below under Example I.

EXAMPLE I

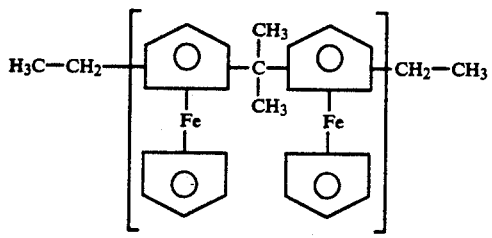

Catocene is coacervated by employing a coacervation reactant product prepared in an aqueous medium of a water-soluble polyol containing the reactants which are a urea derivative and an aldehyde. Example II below, with listed ingredients, for coacervation mixture of parts of 80 water-soluble polyol, 10 parts of triazine, and 10 parts formaldehyde (methanal), produced a coacervation product which is a mixed polymethanal having an empirical formula:

$(-C_9H_{12}N_6O_3-)_N$.

EXAMPLE II

Coacervating Mixture

| Ingredients | Function | Amounts (Parts) |
|---|---|---|
| Water-soluble polyol | (1:1 ratio, aqueous medium) | 70–80 |
| Urea derivative | reactant | 10–15 |
| Formaldehyde | reactant | 10–15 |

Figure 1:
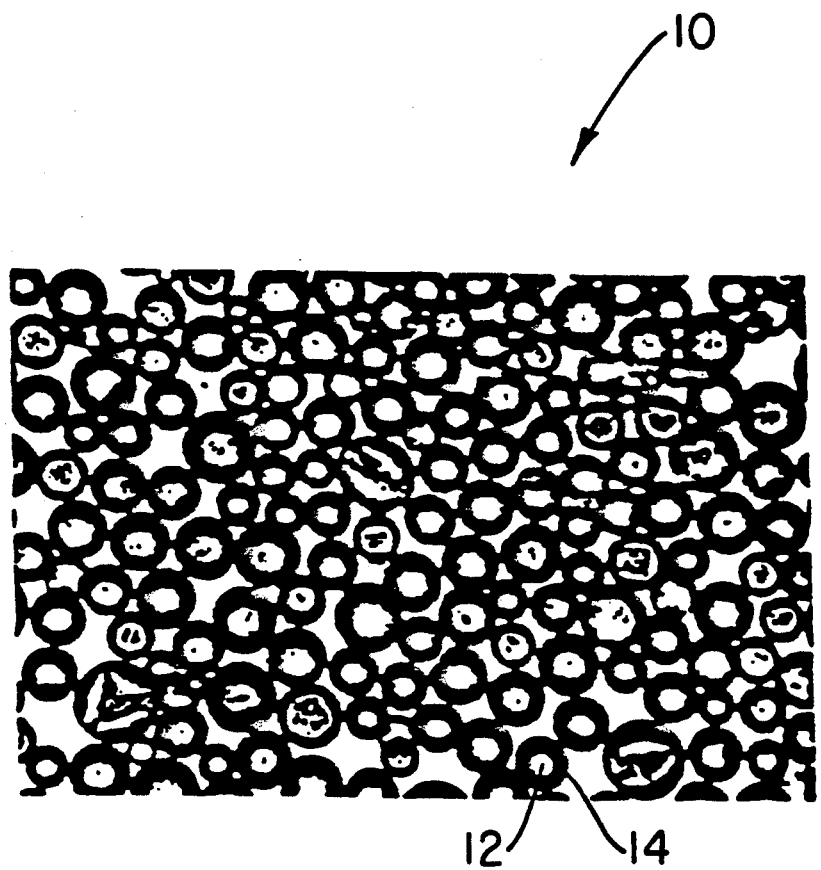
FIG. 1 of the drawing depicts an illustration of a photomicrograph of coacervated Catocene.

Catocene of about 25 parts (in micro-droplet form) is suspended in about 100 parts of coacervating mixture set forth in Example II. The coacervation reaction is conducted at 40°–55° C. in a reaction vessel provided with means for heating and means for vigorous agitation of disperse Catocene in micro-droplet form for intimate contact with reactants. At this reaction condition, the polymethanal undergoes a polymerization reaction to produce a coating on the surface of the Catocene droplets while freely moving in the aqueous medium. The illustration of a photomicrograph of coacervated Catocene 10 of FIG. 1 shows Catocene droplet 12 with a polymer coating 14 surrounding the Catocene droplet.

The following evaluations of the coacervated product were made as to the stability by weight loss measurements as measured by isothermal thermogravimetric analysis, propellant mixing stability, and propellant burning-rate comparisons with Catocene (noncoacervated).

Figure 2:
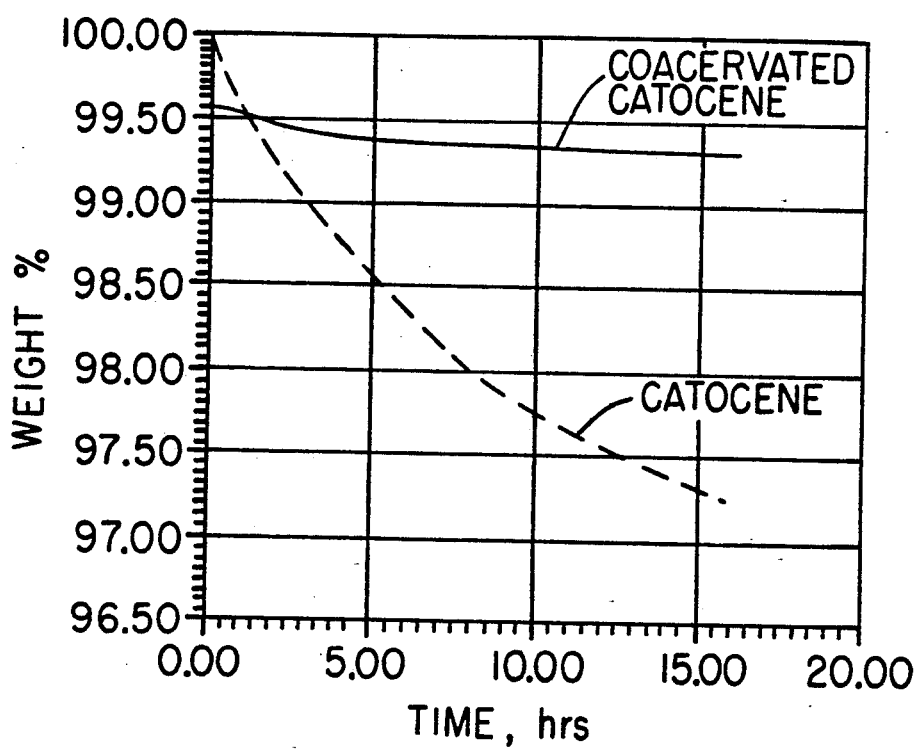
FIG. 2 depicts graphically a comparison of weight loss during thermogravimetric analysis of Catocene and coacervated Catocene.

The weight loss that the coacervated material had undergone in 15 hours at 71° C. was determined by means of an isothermal thermogravimetric analysis. The results are presented in FIG. 2. It consists of a plot depicting weight loss vs. time. The data show that the coacervated material had undergone an initial weight loss probably due to unpolymerized constituents evolving from the coacervating material or from Catocene which had not been fully coacervated. After the initial weight loss, no further loss was observed. On the other hand, the liquid Catocene underwent a marked major weight loss.

Figure 3:
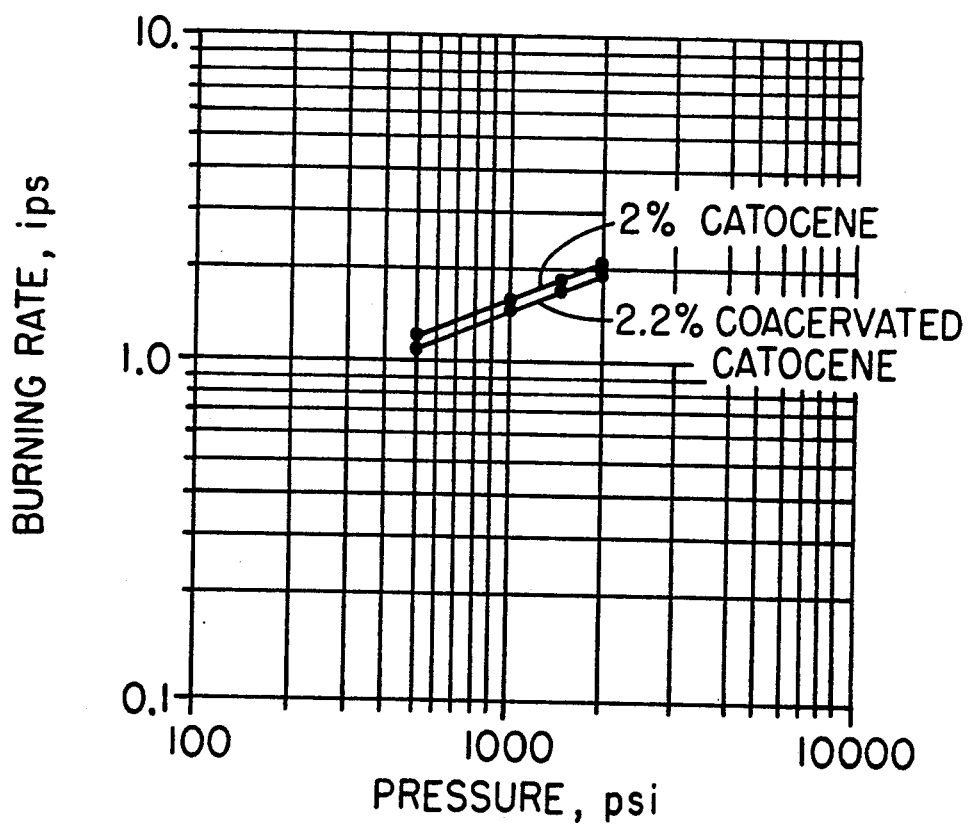
FIG. 3 depicts graphically a comparison of the burning rate vs. pressure relationship of propellants containing Catocene and coacervated Catocene.

The coacervated Catocene was comparatively evaluated against Catocene in a high-burning rate composite solid propellant. The formulation is presented in TABLE I. Catocene content that was incorporated in the propellant was 2%. To ensure catalyst equivalency with the coacervated Catocene, the amount of the latter that was used was 2.2%. This was to compensate for the coacervated coating. Strand burning rate specimens were prepared, and tested. The results are presented in FIG. 3. The data show that, at a chamber pressure of 1000 psia, Catocene enhanced the uncatalyzed propellant burning rate by 2.7 ips and by the coacervated Catocene by 2.5 ips. The minor reduction in burning rate was considered to be fully acceptable in light of the benefits (reduced diffusibility) which resulted from the use of coacervated Catocene.

TABLE I

Baseline Propellant Used in the Comparative Evaluation of the Burning Rates of Coacervated Catocene and Catocene

| Ingredients | Propellant Catocene-Catalyzed (Wt-%) | Coacervated Catocene Catalyzed (Wt-%) |
|---|---|---|
| Hydroxyl-terminated polybutadiene prepolymer | 12.0 | 12.0 |
| Isophorone diisocyanate | | |
| Catocene | 2.0 | 0.0 |
| Coacervated Catocene | | 2.2 |
| Ammonium perchlorate | | |
| 200-micrometers* | 24.0 | 24.0 |
| 20-micrometers* | 25.0 | 25.0 |
| 3-micrometers* | 21.0 | 21.0 |
| Aluminum | 16.0 | 16.0 |
| 30-micrometers* | | |
| Total weight - % | 100. | 100.2 |

\* - weight-mean-diameter

In order to determine that the coacervated Catocene remained fully contained during its processing into propellant, the propellant was (a) examined microscopically, and (b) extracted in a Soxhlet extractor. The microscopic examination showed that very nearly all of the coacervated material was intact, and had not undergone rupture. The results of the extractions, which were carried out in triplicate, are presented in Table II. These data confirmed that the propellant's burning rate obtained with the coacervated material was accurate; and that no breakup of the coacervated material had occurred.

TABLE II

Comparison of the Quantity of Catocene Extracted From Coacervated Catocene-Containing Propellant VS Catocene-Containing Propellant

|  | Propellant Containing (2% Catocene) | (Propellant Containing 2.2% Coacervated Catocene) |
|---|---|---|
| amount extracted | 2.0 | 0.01 |

In the above tests, the Catocene, and the coacervated Catocene, were incorporated into the propellant using a 1-pint, high-shear, Baker-Perkins mixer, and these burning rate catalysts were added to the mixer after all of the other ingredients, including the crosslinking agent had been added. The catalysts were added over a period of six minutes. The mixing was continued for 3 hours, and specimens were withdrawn at different intervals, and subjected to the extraction process to determine the amount of coacervated material which had undergone rupture. The results show that the amount of rupture of the coacervated film increases as the shear time increases. Thus, for normal mixing times the amount of rupture due to mixing of propellant are considered to be of a permissible level.

The effect of coacervation on the propellant's mechanical properties containing both the Catocene and coacervated Catocene were compared. The tests were carried out at 25° C. using JANNAF Class "C" tensile specimens, and compensation was made for any reduction in the specimen's cross-sectional areas that occurred during the tests. The mechanical properties appear in Table III.

TABLE III

Comparison of the Mechanical Properties of Catocene-Containing Propellant and Coacervated Catocene-Containing Propellant

|  | Test Results | |
|---|---|---|
| Test Conditions/ Tests | Catocene- Containing Propellant | Coacervated Catocene- Containing Propellant |
| Test Conditions | | |
| temperature (°C.) | 25 | 25 |
| strain rate (ipm) | 2.0 | 2.0 |
| Test Results | | |
| tensile strength (psi) | 225 | 226 |
| strain @ max. stress (%) | 34.2 | 35.0 |
| stress at rupture (psi) | 223 | 225 |
| strain at max. stress (%) | 34.0 | 35.0 |
| tangent modulus (psi) | 800 | 755 |

One problem in using Catocene as a burning rate catalyst in propellant has been the increased sensitivity to explosion of Catocene-containing propellants especially on aging. To assess the comparative sensitivity of Catocene and coacervated-Catocene, testing for sensitivity was carried out in a 1:1 mixture with 90 micrometer ammonium perchlorate. The results of these sensitivity studies are contained in Table IV. A major change in sensitivity was measured when the coacervated-Catocene was compared to Catocene. Only minor differences in impact and friction were observed.

TABLE IV

Sensitivity Comparison of Catocene and Coacervated-Catocene Blended with Ammonium Perchlorate

| Test | Catocene/90-Micrometer Ammonium Perchlorate (1:1 Ratio) | Coacervated-Catocene/90-Micrometer Ammonium Perchlorate (1:1 Ratio) |
|---|---|---|
| Impact (Kg-cm) | 5.5 | 5.0 |
| Friction (psi) (@ 90° drop angle) | 500 | 400 |
| Electrostatic discharge (joules @ 5 kilovolts) | 0.024 (ignited) | 6.0 (no ignition) |

I claim:

1. A method of microcacervation of a propellant liquid burning rate catalyst ingredient to yield a coacervate of said propellant liquid burning rate catalyst ingredient having a decreased measured sensitivity to explosion as compared with the measured sensitivity of the same propellant liquid burning rate catalyst ingredient which has not been microcacervated, said method of microcoacervation comprising coating said propellant liquid burning rate catalyst ingredient with a polmerized coating while said propellant liquid burning rate catalyst ingredient is in the form of liquid micro-droplets and while suspended in a coacervating mixture, said method comprising:

(i) preparing a coacervating mixture comprised of about 70 to about 80 parts of a 1:1 ratio of water and water-soluble polyol which functions as an aqueous medium, a triazine or a triazine reactant derivative of about 10 to about 15 parts, and an aldehyde or ketone reactant of about 10 to 15 parts, said water soluble polyol selected from the group consisting of a glycol, glycerol, and erythritol, said triazine or a triazine derivative selected from the group consisting of the triazine derivative melamine and triazine, and said aldehyde or ketone selected from the group of water soluble aldehydes or ketones consisting of methanal, ethanal, propanal, propanone, and 2-butanone;

(ii) adding said coacervating mixture to a reaction vessel provided with means for heating and means for vigorous stirring to disperse an introduced said propellant liquid burning rate catalyst ingredient to micro-droplets form for intimate contact with a coacervation product of said reactants in said coacervating mixture;

(iii) introducing said propellant liquid burning rate catalyst ingredient selected from the group consisting of liquid ferrocene and liquid ferrocene derivatives into said reaction vessel containing said coacervation product of said reactants in said coacervating mixture;

(iv) reacting said liquid ferrocene or liquid ferrocene derivatives in said coacervating mixture while vigorously stirring and heating to about 40°-55° C.;

(v) continuing said reacting which produces a coacervate comprised of said liquid ferrocene or liquid ferrocene derivative in micro-droplet form and a polymeric coating of said coacervation product of said reactants on the surface of said micro-droplet; and, (vi) recovering said coacervate produced.

2. The method of microcoacervation of propellant liquid burning rate catalyst ingredient to yield said coacervate as defined in claim 1 wherein said water soluble polyol is glycerine; said triazine or a triazine derivative is triazine; said aldehyde reactant is methanal; said coacervation product of said reactants is a mixed polymethanal having an empirical formula ($-C_9H_{12}N_6O_3-)_n$; and wherein said propellant liquid burning rate catalyst ingredient introduced into said coacervating mixture is 2,2-bis(ethylferrocenyl)propane.

3. The coacervate produced by the method of claim 2 wherein said 2,2-bis(ethylferrocenyl)propane in microdroplet is coated with a polymeric coating which remains intact during propellant mixing, said polymeric coating comprising about 10% by weight of said coacervate.

* * * * *